(12) United States Patent
Homann et al.

(10) Patent No.: US 6,929,318 B2
(45) Date of Patent: Aug. 16, 2005

(54) REMOVABLE ROOF ASSEMBLY FOR A MOTOR VEHICLE

(75) Inventors: Bodo Homann, Heimsheim (DE); Andre Scholz, Wiernsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/716,942

(22) Filed: Nov. 20, 2003

(65) Prior Publication Data

US 2004/0150253 A1 Aug. 5, 2004

(30) Foreign Application Priority Data

Nov. 20, 2002 (DE) .......................................... 102 54 130

(51) Int. Cl.[7] .............................. B60J 7/11; B60J 7/185
(52) U.S. Cl. .................... 296/218; 296/224; 292/DIG. 5
(58) Field of Search ................................ 296/218, 219, 296/224, 216.09; 292/DIG. 5

(56) References Cited

U.S. PATENT DOCUMENTS

| | | |
|---|---|---|
| 3,476,437 A | 11/1969 | Schroeder et al. |
| 4,346,932 A * | 8/1982 | Iwata et al. .................. 296/218 |
| 4,729,596 A | 3/1988 | Fujihara et al. |
| 6,059,356 A * | 5/2000 | Hoelzel et al. ............. 296/218 |

FOREIGN PATENT DOCUMENTS

| | | | |
|---|---|---|---|
| DE | 14 55 743 | 10/1976 | |
| DE | 3928813 C1 | 10/1990 | |
| DE | 41 37 344 | 6/1992 | |
| DE | 94 06 435 | 7/1994 | |
| GB | 1162627 | * 8/1969 | .................. 296/218 |

* cited by examiner

Primary Examiner—Dennis H. Pedder
(74) Attorney, Agent, or Firm—Crowell & Moring LLP

(57) ABSTRACT

A removable roof is provided for a motor vehicle, particularly a passenger car, and covers an opening between a windshield frame and a body frame structure of a vehicle body extending, for example, behind vehicle occupant seats. The roof comprises a dimensionally stable material and cooperates by means of a form-lockingly operating fixing system with the windshield frame. For optimizing the connection of the roof with the windshield frame, the fixing system of the roof has a first fixing device and a second fixing device. The two fixing devices are arranged offset with respect to one another in the vertical direction of the vehicle by a distance measurement and are caused to engage by means of a movement of the roof in the driving direction.

12 Claims, 5 Drawing Sheets

REMOVABLE ROOF ASSEMBLY FOR A MOTOR VEHICLE

BACKGROUND AND SUMMARY OF THE INVENTION

This application claims the priority of application number 10254130.2, filed in Germany on Nov. 20, 2002, the disclosure of which is expressly incorporated by reference herein.

The invention relates to a removable roof for a motor vehicle passenger car, which in use covers an opening between a windshield frame and a body frame structure of a body of the passenger car, extending behind vehicle occupant seats, said roof comprising a dimensionally stable material and cooperating by means of a form-lockingly operating fixing system with the windshield frame.

The subject matter of this application is related to commonly assigned application Ser. Nos. 10/716,867; 10/716,941; and 10/716,943, filed herewith and based on respective German applications 10254108.6; 10254131.0; and 10254132.9.

On a side facing a windshield frame, a removable roof for motor vehicles known from German Patent Document DE 14 55 743 (Corresponding U.S. Pat. No. 3,476,437) comprises a single form-lockingly operating fixing system. The fixing system is formed by a bearing journal at the roof and a receiving bore at the windshield frame. The bearing journal and the receiving bore are mounted on special consoles which extend away from the roof and from the windshield frame respectively and project into the vehicle occupant compartment.

German Patent Document DE 94 06 435 relates to a roof which has two roof parts fitted together in a longitudinal center plane and held on the windshield frame solely by means of a locking system. The locking system is equipped with a turning handle which, in a closed position, reaches by means of a nose under a tensioning slope of an interior covering.

Finally, from German Patent Document DE 41 37 344 A1, a demountable roof for a passenger car is known which extends between an upper member part of a windshield frame and a vehicle body structure behind backrests of vehicle seats. The vehicle body frame structure comprises a rollover bar system which spans a vehicle occupant compartment of the passenger car transversely to the longitudinal direction of the vehicle. The roof consists of a dimensionally stable material and is constructed as a single component, the roof being held in position by means of a fixing system and a locking system on the member part of the windshield frame and on the vehicle body structure respectively.

It is an object of the invention to create a removable roof for a passenger car which is securely held on a windshield frame by means of a fixing system. However, it should also be reliably ensured that the mounting and the removal of the roof is simple and that the fixing system is distinguished by a good functioning and components which can be implemented in an easy manner.

According to the invention, this object is achieved by providing a removable roof for a motor vehicle, particularly a passenger car, which in use covers an opening between a windshield frame and a body frame structure of a body of the passenger car extending behind vehicle occupant seats, said roof comprising a dimensionally stable material and cooperating by means of a form-lockingly operating fixing system with the windshield frame wherein the fixing system of the roof comprises a first fixing device and a second fixing device, which fixing devices are arranged offset with respect to one another in vertical direction of the vehicle by a distance predetermined and are caused to engage by movement of the roof in a driving direction.

Important advantages achieved by means of the invention are that the roof or its roof elements in connection with the first fixing device and the second fixing device can rapidly and appropriately be fixed on the windshield frame in the installed position and vice-versa. In this case the components and devices of the two fixing systems can be implemented by means of acceptable expenditures and, because they are arranged in a targeted manner, assume a largely embedded and lowered position. According to certain preferred embodiments of the invention, the fact that the bearing journal is held in position by means of an elastic device permits the compensation of tolerances and relative movements between the windshield frame and the vehicle body structure which may be represented by a rollover bar. The angular positions of the bearing journal of the second fixing system with respect to the horizontal line as well as of the above-mentioned bearing system with respect to the flange-type roof extension of the first fixing system cause an optimized alignment of the roof or of the roof elements with respect to the windshield frame and also with respect to the sealing body of the first fixing system according to certain preferred embodiments of the invention. In addition, an excellent sealing action is achieved by means of the sealing sections of the sealing body according to certain preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

The drawing illustrates an embodiment of the invention which will be explained in detail in the following.

DETAILED DESCRIPTION OF THE DRAWINGS

Figure 1:
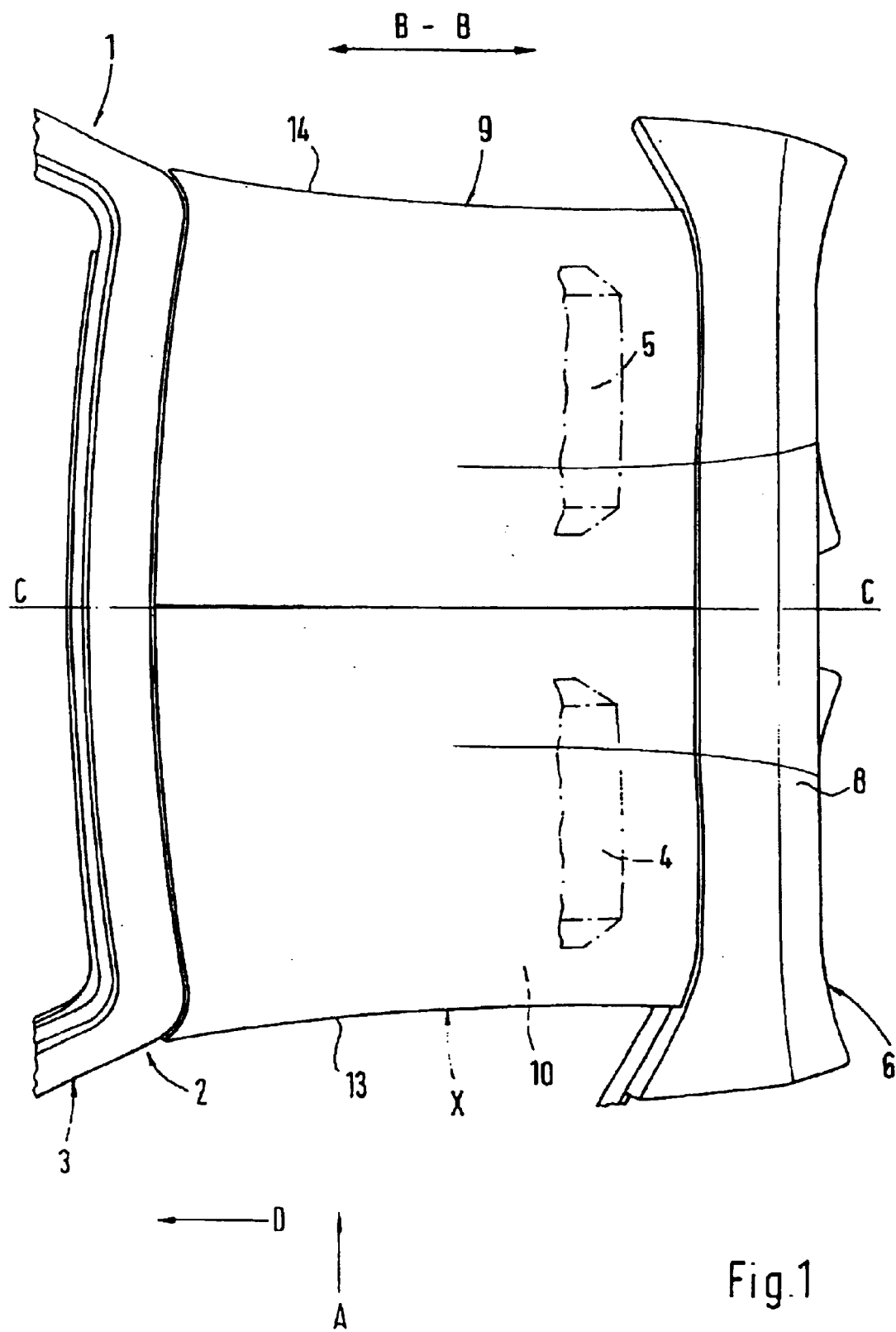
FIG. 1 is a top view of a passenger car with a removable roof constructed according to preferred embodiments of the present invention.

A passenger car 1 comprises an open vehicle body 2 having a windshield frame 3 and a rearward body frame structure 6 extending behind vehicle seats 4, 5, which body frame structure 6 comprises a rollover bar system 8 spanning a vehicle occupant compartment 7. The area between the windshield frame 3 and the rollover bar system 8 is free of supporting member structures which extend in the longitudinal direction B—B of the vehicle and reinforce the vehicle body 2. This means that all bending and torsion moments affecting the vehicle body 2 are to be absorbed by a floor system with its supporting members, which is not shown, so that relative movements between the windshield frame 3 and the rollover bar system 8, which occur, for example, during the driving operation of the passenger car, are taken into account in the case of the connection of a dimensionally stable removable roof 9 with the latter by constructive measures.

The roof 9 comprises a firm plastic material, for example, of a highly stressable type, particularly a fiber-reinforced plastic material—CFK—, covering an opening 10 between the windshield frame and the rollover bar system 8 or rearward body frame structure 6, and is connected with the vehicle body 2 by means of a form-lockingly operating fixing system 11 and a locking system 12. One example of a locking system is indicated in the initially mentioned German Patent Document DE 14 55 743—FIG. 4. Furthermore, the roof 9 comprises two roof elements 13, 14 which are fitted together without connecting elements, thus without hinges, in a longitudinal center plane C—C. Each roof element, for example, 13, interacts by means of a first fixing device 15 and a second fixing device 16 of the fixing system 11 with the windshield frame and the locking system 12 with the rollover device 8.

Figure 2:
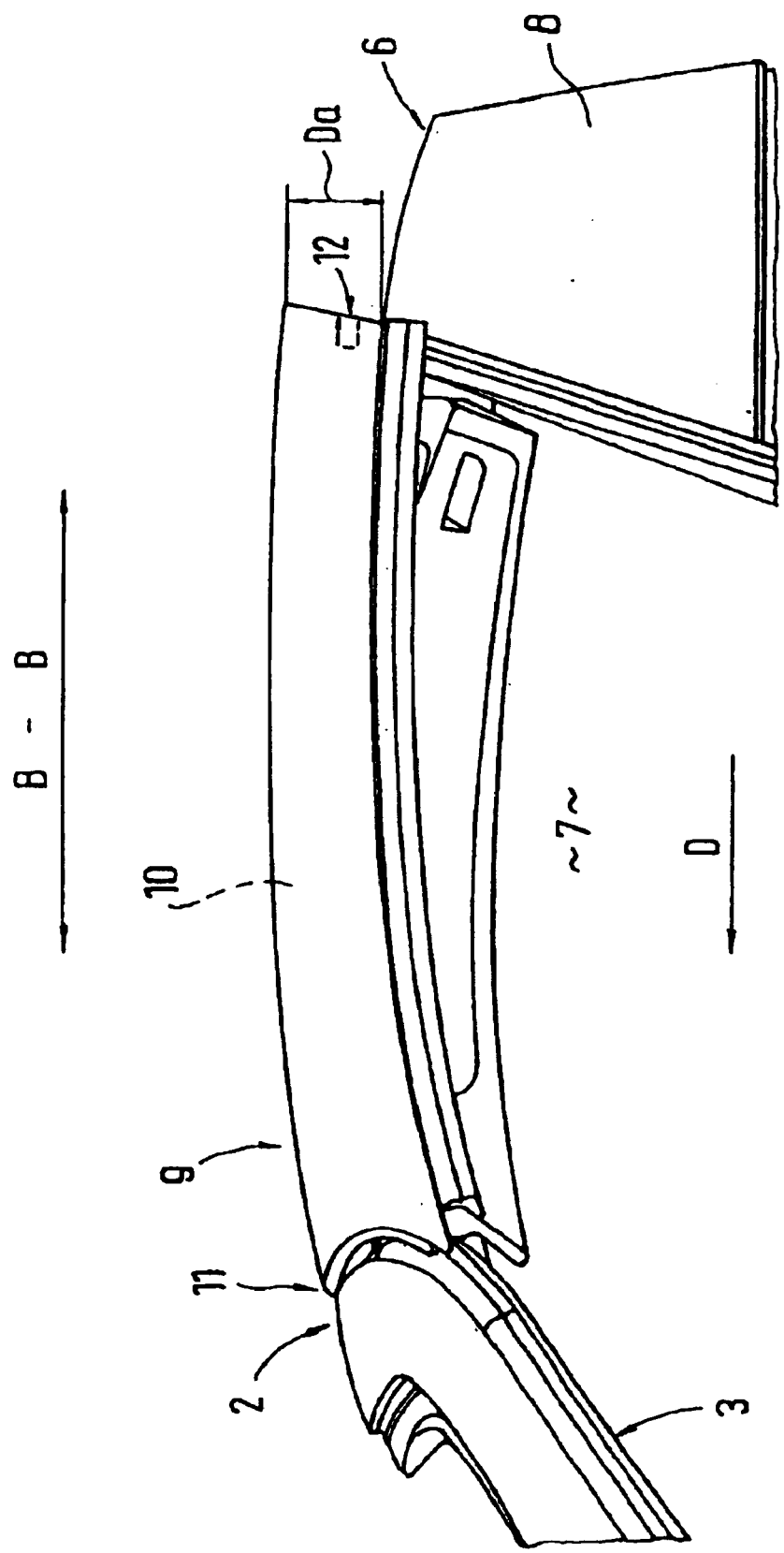
FIG. 2 is a view in the direction of the arrow A of FIG. 1.
Figure 3:
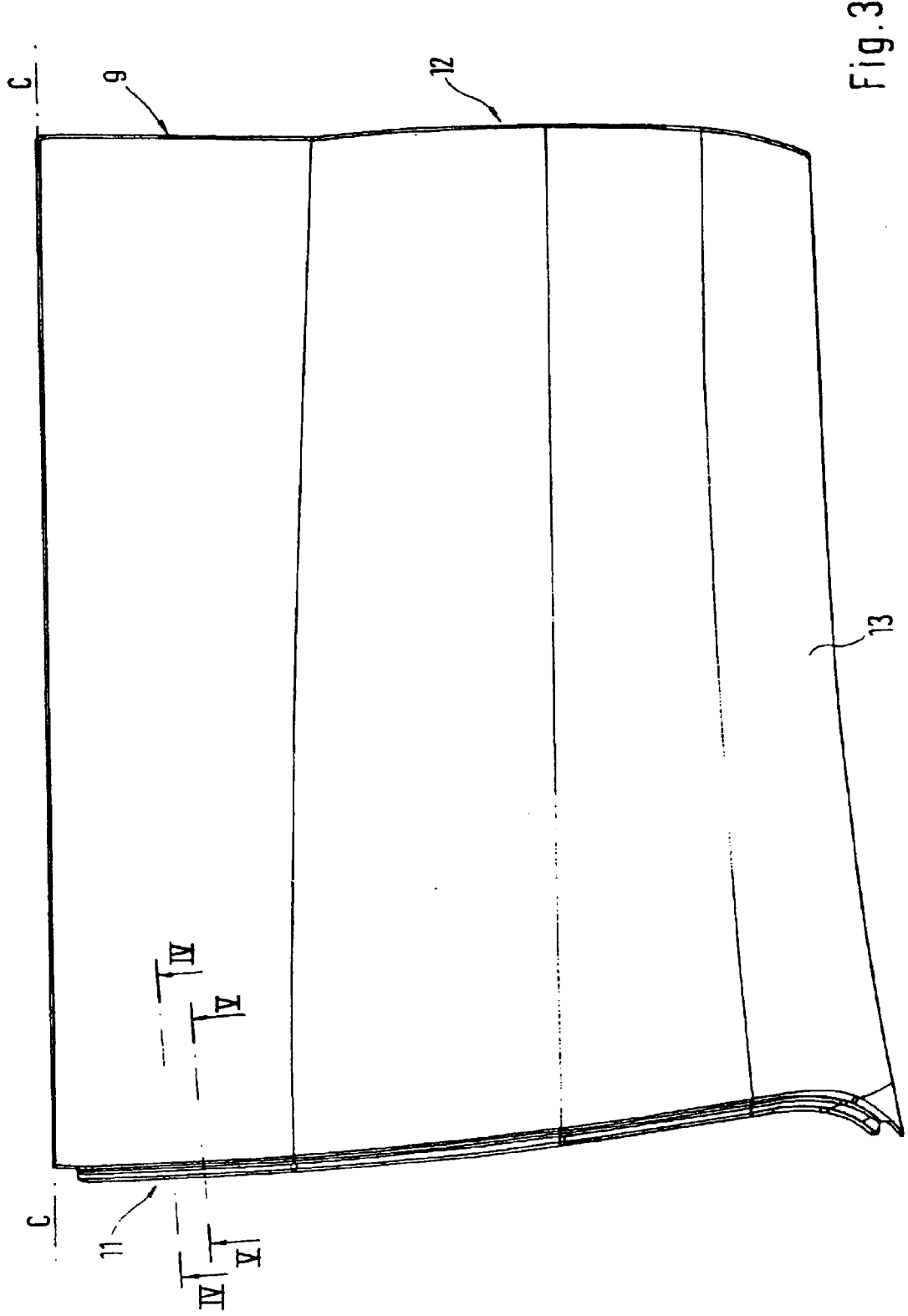
FIG. 3 is a view of an enlarged detail X of FIG. 1.

The roof element 13 and the roof element 14 can be stored in a stacked form in a storage space, which is not shown, of the passenger car 1; when the passenger car is in the open condition. For mounting the roof element 13, it is engaged with the fixing devices 15 and 16 by means of a movement directed in the driving direction D—FIG. 2—. In this case, the roof element 13 is slightly lifted, that is, by the extent Da, with respect to the rollover bar system 8. After a defined lowering of the roof element 13, the latter takes up its construction position, and the locking system 12 is operative. The locking system or assembly 12 is located at a rear end of the roof 9 for locking the roof at the body frame structure 6 after the roof 9 has been fixed by the fixing system 11 at the windshield frame 3, as is apparent from FIG. 2. The demounting of the roof element 13 takes place in the reverse sequence. Comparable mounting steps are required for the handling of the roof element 14.

Figure 4:
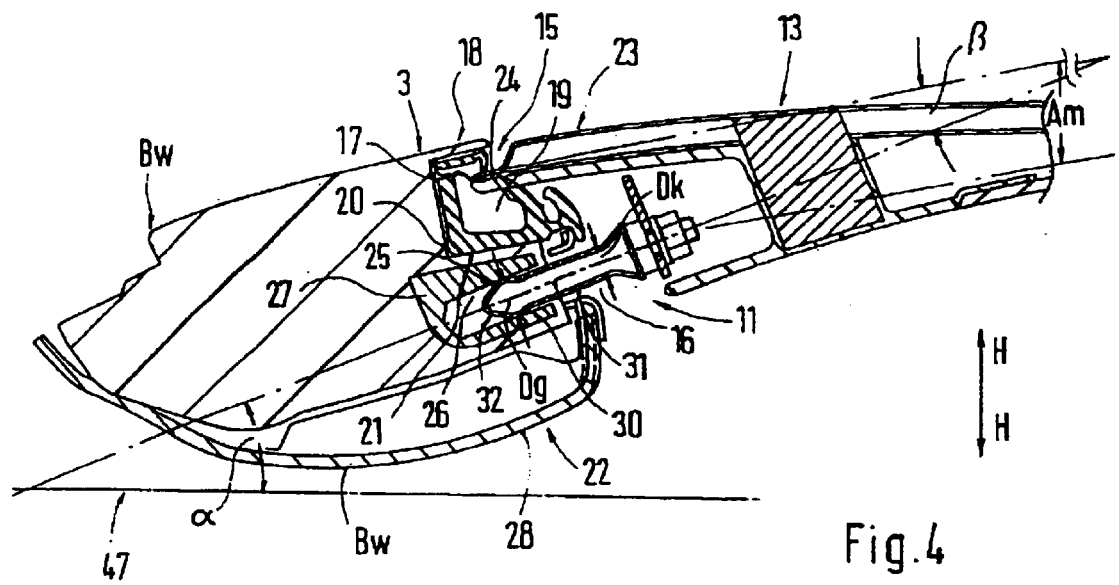
FIG. 4 is an enlarged sectional view according to Line IV—IV of FIG. 3.
Figure 5:
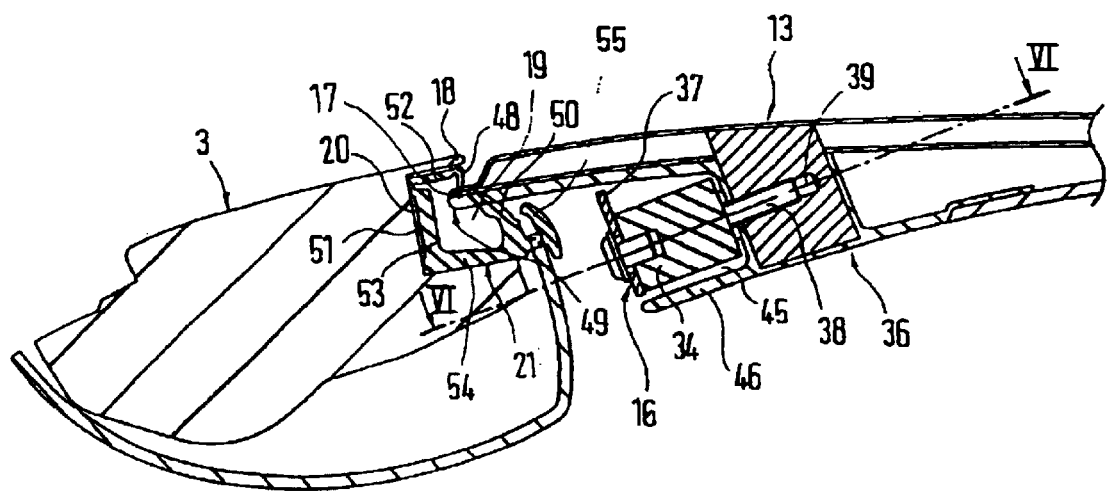
FIG. 5 is an enlarged sectional view according to Line V—V of FIG. 3.

The first fixing device 15 is illustrated in the longitudinal views according to FIGS. 4 and 5 and is equipped with a flange-type forward roof extension 17 of the roof element 13, which roof extension 17 extends in the longitudinal direction B—B of the vehicle and reaches under an exterior leg wall 18 of an open U-shaped receiving device 19 oriented toward the roof element 13. The receiving device 19 also comprises a web wall 20 as well as an interior leg wall 21, and it is a component of an upper cross-member 22 of the windshield frame 3. With respect to an exterior wall 23 of the roof element 13 extending flush with the exterior leg wall 18, the roof extension 17 is constructed as a step 24.

The second fixing device 16 has a bearing journal 25 which projects into a receiving bore 26, which bearing journal 25 is provided on the roof element 13, and which receiving bore 26 is provided on the transverse member 22 of the windshield frame 3. The receiving bore 26 is worked into a metallic insert 27 which is integrated into the windshield frame 3 consisting, for example, of a fiber-reinforced plastic material, or the cross member 22, in such a manner that the above-mentioned insert 26 is essentially fully embedded or surrounded by boundary walls Bw of the windshield frame 3. Below the bearing journal 25, the cross member 22 is provided with a cushioned member section 28. Adjacent to its free end 29, the bearing journal 25 has a molded-on guiding device 30 of a largest diameter Dg, from which it merges, on one side, into a shaft 31 with a smaller diameter Dk and from which, on the other side, it tapers off as a conical point 32.

Figure 6:
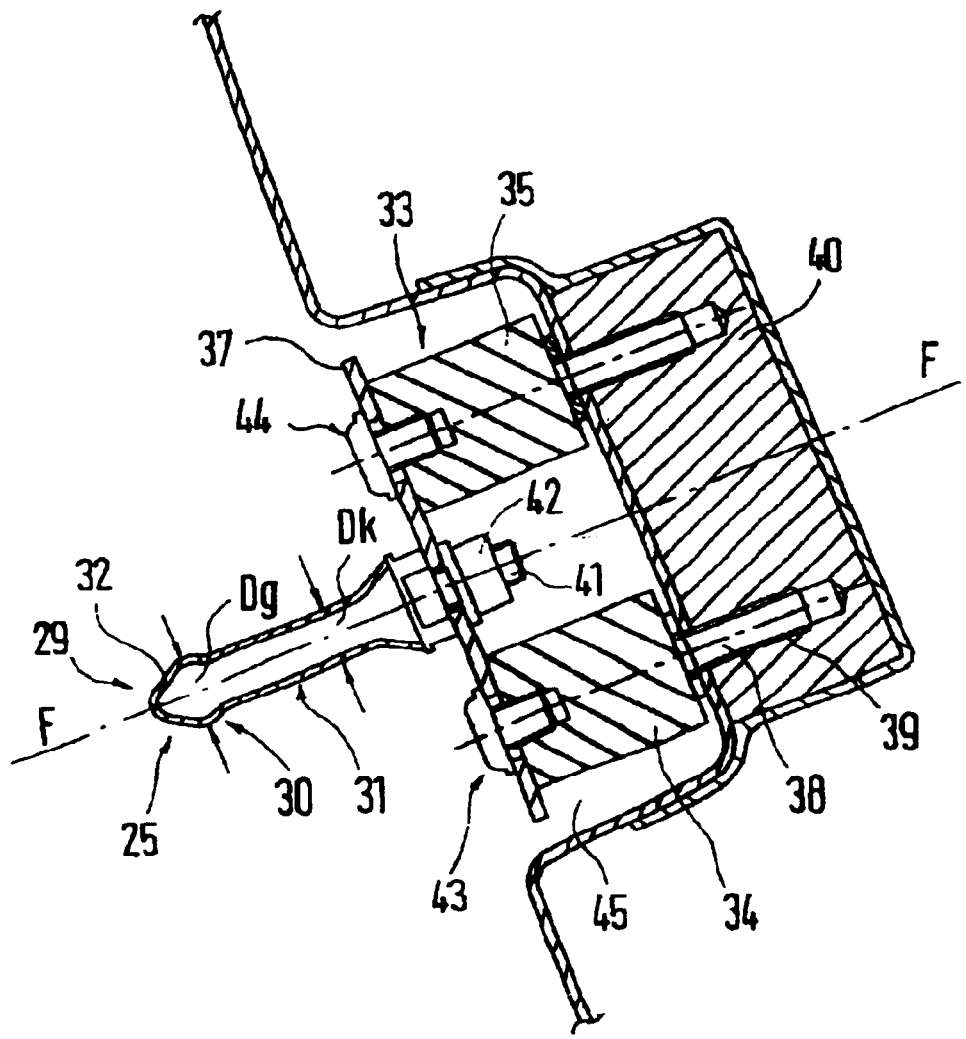
FIG. 6 is a sectional view according to Line VI—VI of FIG. 5.

FIGS. 5 and 6 illustrate that the bearing journal 25 is fastened to the roof element 13 by means of an elastic device 33 which is provided with two elastic bodies 34 and 35, spaced in the transverse direction E—E of the vehicle and preferably having a circular-cylindrical cross-section, which, on the one hand, are held on a cross member 36 of the roof element 13 and, on the other hand, are connected with a plate-type holding member 37 for the bearing journal 25. Each elastic body, for example, elastic body 34, rests by means of a threaded pin 38 in a threaded bore 39 of a metallic insert 40 which is worked into the cross member 36 of the roof element 13 in a fully covered manner. The bearing journal 25 extends in a longitudinal center plane F—F between the elastic bodies 34 and 35 and is held by means of a threaded pin 41 and a screw nut 42 on the holding member 37, the holding member 37 being fastened by means of screws 43 and 44 on the elastic bodies 34 and 35. In order to accommodate the elastic bodies 34 and 35, possibly also the holding member 37, in a favorable manner in the roof element 13, specifically in a largely sunk manner, the latter is provided with a recess 45. In contrast to the vehicle occupant compartment 7, the elastic bodies 34, 35 and the holding member 37 are covered by means of an interior boundary wall 46 which extends away from the cross member 36 and bounds the recess 45. Two fixing systems 11 provided at a distance from one another in the transverse direction H—H of the vehicle can be mounted on each roof element 13 and 14, in which case each fixing system 11 can be equipped with a first fixing device 15 and a second fixing device 16. The latter are arranged offset in the vertical direction F—F of the vehicle, which is indicated by a distance measurement Am.

In order to ensure a targeted function of the first fixing device 15 and of the second fixing device 16, in the longitudinal sectional view according to FIG. 4, the bearing journal 26 extends at an acute angle $\alpha$ (approximately 15° to 20°) with respect to the horizontal line 47. In this case, the bearing journals 25 of the second fixing device 16 and the forward flange-type roof extension 17 extend at an acute angle $\beta$ (approximately 8° to 12°) with respect to one another.

According to FIGS. 4 and 5, a first sealing section 48 is arranged between the exterior leg wall 18 and the roof extension 17, and a second sealing section 50 is arranged between an interior wall 49 of the roof element 13 and the interior leg wall 21 of the U-shaped receiving device 19. The first sealing section 48 and the second sealing section 50 are components of a sealing body 51 which extends by means of fitting walls 52, 53, 54 along the exterior leg wall 18, the web wall 20 and the interior leg wall 21 of the receiving device 19. Finally, another important characteristic of the sealing body 51 is a web 55 which extends away from the second sealing section 50 and, together with the above-mentioned sealing section 50, forms a type of groove for the targeted drainage of collected water.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Removable roof for a passenger car, which in use covers an opening between a windshield frame and a body frame structure of a body of the passenger car extending behind vehicle occupant seats, said roof comprising a dimensionally stable material and cooperating by means of a form-lockingly operating fixing system with the windshield frame, wherein the fixing system of the roof comprises a first fixing device and a second fixing device, which fixing devices are arranged offset with respect to one another in a vertical direction of the vehicle by a predetermined distance and are caused to engage by movement of the roof in a driving direction, wherein the first fixing device has a flange-type forward roof extension of the roof which extends in a longitudinal direction of the car and reaches under an exterior leg wall of an open U-shaped receiving device oriented toward the roof, wherein the second fixing device comprises at least one bearing journal which projects into a receiving bore, and wherein the bearing journal is held in position by an elastic device.

2. Removable roof according to claim 1, wherein the elastic device comprises two elastic bodies spaced in a transverse direction of the vehicle, said elastic bodies having a circular-cylindrical cross-section, on first sides, being held on a cross member of the roof, and, on their other sides, being connected with a plate-type holding member for the bearing journal.

3. Removable roof according to claim 2, wherein each elastic body rests by means of a threaded pin in a threaded bore in a metallic insert of the roof.

4. Removable roof according to claim 2, wherein the holding member is connected by means of screws with the elastic bodies.

5. Removable roof according to claim 2, wherein the bearing journal extends in a longitudinal center plane between the elastic bodies and is connected with the holding member by means of a threaded pin and a screw nut.

6. Removable roof according to claim 2, wherein the elastic device with the elastic bodies and the holding member are arranged at least largely sunk in a recess of the roof.

7. Removable roof according to claim 2, wherein the roof has two roof elements fitted together in a longitudinal center plane of the passenger car, at least one said bearing journal with elastic bodies being provided on each roof element, which bearing journal cooperates with a corresponding receiving bore of the windshield frame.

8. Removable roof for a passenger car, which in use covers an opening between a windshield frame and a body frame structure of a body of the passenger car extending behind vehicle occupant seats, said roof comprising a dimensionally stable material and cooperating by means of a form-lockingly operating fixing system with the windshield frame, wherein the fixing system of the roof comprises a first fixing device and a second fixing device, which fixing devices are arranged offset with respect to one another in a vertical direction of the vehicle by a predetermined distance and are caused to engage by movement of the roof in a driving direction, wherein the first fixing device has a flange-type forward roof extension of the roof which extends in a longitudinal direction of the car and reaches under an exterior leg wall of an open U-shaped receiving device oriented toward the roof, wherein the second fixing device comprises at least one bearing journal which projects into a receiving bore, and wherein in a longitudinal view, the bearing journal of the second fixing device extends at an acute angle with respect to a horizontal line.

9. Removable roof according to claim 2, wherein in a longitudinal view, the bearing journal of the second fixing device extends at an acute angle with respect to a horizontal line.

10. Removable roof for a passenger car, which in use covers an opening between a windshield frame and a body frame structure of a body of the passenger car extending behind vehicle occupant seats, said roof comprising a dimensionally stable material and cooperating by means of a form-lockingly operating fixing system with the windshield frame, wherein the fixing system of the roof comprises a first fixing device and a second fixing device, which fixing devices are arranged offset with respect to one another in a vertical direction of the vehicle by a predetermined distance and are caused to engage by movement of the roof in a driving direction, wherein the first fixing device has a flange-type forward roof extension of the roof which extends in a longitudinal direction of the car and reaches under an exterior leg wall of an open U-shaped receiving device oriented toward the roof, wherein the second fixing device comprises at least one bearing journal which projects into a receiving bore, and wherein the bearing journal of the second fixing device and the flange-type roof extension of the first fixing device extend in a longitudinal sectional view at an acute angle with respect to one another.

11. A passenger car roof assembly comprising:

a windshield frame, a body frame structure spaced from the windshield frame with a roof opening between the windshield frame and the body frame structure, a removable roof member operable to close at least part of the roof opening, said roof member being formed of dimensionally stable material, a form locking fixing assembly for form lockingly fixing a forward end of the roof member at the windshield frame, and a roof member locking assembly at a rear end of the roof member for locking the roof member at the body frame structure after the roof member has been fixed by the fixing assembly at the windshield frame, wherein the fixing assembly includes first and second fixing devices arranged offset vertically with respect to one another when the roof member is in a roof opening closing position, said first and second fixing devices being engaged by movement of the roof member in a vehicle driving direction toward the windshield frame, wherein the first fixing device has a flange-type forward roof extension of the roof member which extends in a longitudinal direction of the vehicle and reaches under an exterior leg wall of an open U-shaped receiving device oriented toward the roof member, wherein the second fixing device comprises at least one bearing journal which projects into a receiving bore, and wherein the bearing journal is held in position by an elastic device.

12. A passenger car roof assembly according to claim 11, wherein the elastic device comprises two elastic bodies spaced in a transverse direction of the vehicle, said elastic bodies having a circular-cylindrical cross-section, on first sides, being held on a cross member of the roof member, and, on their other sides, being connected with a plate-type holding member for the bearing journal.

* * * * *